(12) United States Patent
Kunishima

(10) Patent No.: US 9,863,521 B2
(45) Date of Patent: Jan. 9, 2018

(54) RACK HOUSING MANUFACTURING METHOD AND RACK HOUSING

(71) Applicant: JTEKT CORPORATION, Osaka-shi, Osaka (JP)

(72) Inventor: Takeshi Kunishima, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 401 days.

(21) Appl. No.: 14/599,037

(22) Filed: Jan. 16, 2015

(65) Prior Publication Data
US 2015/0204435 A1 Jul. 23, 2015

(30) Foreign Application Priority Data
Jan. 22, 2014 (JP) .................................. 2014-009684

(51) Int. Cl.
| | | |
|---|---|---|
| F16H 57/032 | (2012.01) | |
| B62D 3/12 | (2006.01) | |
| B29C 45/14 | (2006.01) | |
| B29C 70/02 | (2006.01) | |
| B29C 70/46 | (2006.01) | |
| B29K 101/12 | (2006.01) | |
| B29L 31/30 | (2006.01) | |
| B29C 65/70 | (2006.01) | |
| B29C 43/02 | (2006.01) | |

(Continued)

(52) U.S. Cl.
CPC ..... *F16H 57/032* (2013.01); *B29C 45/14336* (2013.01); *B29C 45/14508* (2013.01); *B29C 45/14786* (2013.01); *B29C 70/021* (2013.01); *B29C 70/462* (2013.01); *B62D 3/12* (2013.01); *B29C 45/1418* (2013.01); *B29C 65/42* (2013.01); *B29C 65/70* (2013.01); *B29C 66/1312* (2013.01); *B29C 66/543* (2013.01);

(Continued)

(58) Field of Classification Search
CPC .............. F16H 57/032; B29C 70/462; B29C 45/14786; B29C 45/14336; B29C 70/021; B29C 45/14508; B29C 2043/3665; B29C 2045/14483; B29C 45/1418; B29C 66/71; B29C 65/42; B29C 66/1312; B29C 66/543; B29C 66/547; B29C 66/72141; B29C 66/721; B29C 66/7212; B29C 66/73921; B29C 2043/028; B29C 65/70; B62D 3/12; Y10T 74/2186; B29L 2031/06; B29L 2023/00; B29L 2031/75; B29L 2031/3002; B29L 2031/3055; B29K 2105/16; B29K 2101/12
See application file for complete search history.

(56) References Cited

U.S. PATENT DOCUMENTS

2005/0208263 A1   9/2005 Wilkens et al.
2016/0001500 A1*  1/2016 Kunishima ........... B29C 70/465
                                                    74/422

FOREIGN PATENT DOCUMENTS

DE   10 2011 109701 A1   2/2013
DE   10 2012 018788 A1   3/2013
(Continued)

OTHER PUBLICATIONS

Jun. 10, 2015 Extended Search Report issued in European Application No. 15151445.2.

*Primary Examiner* — John C Hong
(74) *Attorney, Agent, or Firm* — Oliff PLC

(57) ABSTRACT

A manufacturing method includes: forming a tubular portion of a rack housing by press forming from prepregs formed by stacking fiber-reinforced composite materials obtained by impregnating fiber sheets with a thermoplastic resin; and thereafter injecting a thermoplastic resin containing fillers for injection molding to form coupling portions integrated with metal rings. A rack housing is manufactured by the manufacturing method described above.

8 Claims, 4 Drawing Sheets

(51) Int. Cl.
   *B29L 31/00* (2006.01)
   *B29C 65/42* (2006.01)
   *B29C 65/00* (2006.01)
   *B29L 23/00* (2006.01)
   *B29K 105/16* (2006.01)
   *B29L 31/06* (2006.01)
   *B29C 43/36* (2006.01)

(52) U.S. Cl.
   CPC ............ *B29C 66/547* (2013.01); *B29C 66/71* (2013.01); *B29C 66/721* (2013.01); *B29C 66/7212* (2013.01); *B29C 66/72141* (2013.01); *B29C 66/73921* (2013.01); *B29C 2043/028* (2013.01); *B29C 2043/3665* (2013.01); *B29C 2045/14483* (2013.01); *B29K 2101/12* (2013.01); *B29K 2105/16* (2013.01); *B29L 2023/00* (2013.01); *B29L 2031/06* (2013.01); *B29L 2031/3002* (2013.01); *B29L 2031/3055* (2013.01); *B29L 2031/75* (2013.01); *F16H 2057/0325* (2013.01); *Y10T 74/2186* (2015.01)

(56) References Cited

FOREIGN PATENT DOCUMENTS

| | | |
|---|---|---|
| EP | 1 504 889 A2 | 2/2005 |
| JP | 2013-208927 A | 10/2013 |

\* cited by examiner

RACK HOUSING MANUFACTURING METHOD AND RACK HOUSING

INCORPORATION BY REFERENCE

The disclosure of Japanese Patent Application No. 2014-009684 filed on Jan. 22, 2014 including the specification, drawings and abstract, is incorporated herein by reference in its entirety.

BACKGROUND OF THE INVENTION

1. Field of the Invention

The present invention relates to a rack housing manufacturing method and a rack housing manufactured by the manufacturing method.

2. Description of Related Art

In steering devices for automobiles etc., a rack housing is used to fix a rack shaft to a vehicle body frame while supporting the rack shaft so as to be linearly reciprocally movable. The rack housing is formed to be long in the axial direction of the rack shaft, and receives a steering reaction force transferred from wheels during steering. Therefore, in general, the rack housing as a whole is formed integrally from die-cast aluminum, which is excellent in strength and rigidity, or the like.

With a demand for energy saving in recent years, however, there is also a desire for weight reduction of automobile components. Therefore, it is also considered to reduce the weight of the rack housing, which occupies a large weight ratio in the total weight of the steering device, in addition to securing necessary strength and rigidity. For example, the rack housing is divided into a tubular portion for insertion of the rack shaft, and coupling portions provided at both ends of the tubular portion to be coupled to different members. It is considered to reduce the weight of the rack housing by forming the tubular portion, among such components, from fiber-reinforced composite materials such as Carbon Fiber Reinforced Plastics (CFRP) obtained by impregnating carbon fibers with a thermoplastic resin.

The coupling portions, which are provided with portions for insertion of a pinion shaft, insertion of a rack guide (support yoke), and attachment to a vehicle body, may be formed from die-cast aluminum or the like as in the related art, and coupled to the tubular portion through screwing, heli-sert insertion, metal screw integral forming, or the like. In the invention described in Japanese Patent Application Publication No. 2013-208927 (JP 2013-208927 A), metal rings that constitute at least openings of the portions for insertion of a pinion shaft, insertion of a rack guide, and attachment to a vehicle body are set to a mold together with a tubular portion formed from fiber-reinforced composite materials, and a thermoplastic resin is injected for injection molding to form a rack housing. This further reduces the weight of the rack housing.

However, it takes a long time to form a tubular portion using fiber-reinforced composite materials containing a thermoplastic resin such as the CFRP. That is, it takes approximately five hours or more since the start of heating until the completion of the tubular portion with the thermoplastic resin completely cured, including a fluidization time in which sheet-shaped prepregs of the fiber-reinforced composite materials are heated and softened to be formed into a tubular shape, and a temperature rising time in which the prepregs which have been shaped into a tubular shape are further heated to the curing temperature of the thermoplastic resin.

The period of five hours is significantly long considering that the cycle time desired for the manufacture of automobile components is about one minute. In addition, a large amount of energy is consumed to keep heating the components during the period. Such factors may lead to a cost increase.

SUMMARY OF THE INVENTION

An object of the present invention is to provide a method of efficiently manufacturing a rack housing that is lightweight compared to that according to the related art, which as a whole is formed from die-cast aluminum or the like, in as short a time as possible and with as little energy as possible, and a rack housing manufactured by the manufacturing method.

The present invention provides a rack housing manufacturing method including: setting metal rings for coupling with or for insertion of different members in regions of a mold corresponding to coupling portions, the mold corresponding to a three-dimensional shape of a rack housing including a tubular portion that covers a rack shaft and the coupling portions which are continuous with both ends of the tubular portion to be coupled to the different members, and setting two heated prepregs in a region of the mold corresponding to the tubular portion, the prepregs being formed by stacking at least two layers of fiber-reinforced composite materials obtained by impregnating fiber sheets with a thermoplastic resin; clamping the die to form the two prepregs by press forming each into a shape having a semi-tubular body corresponding to half a circumference of the tubular portion and connecting portions in a flat plate shape extending outward from both ends of the semi-tubular body in a circumferential direction over an entire length of the tubular portion in an axial direction, and joining the semi-tubular bodies to each other with side surfaces of their respective connecting portions facing each other to form the tubular portion; and injecting a thermoplastic resin containing fillers for injection molding into an entirety of the regions corresponding to the coupling portions and the tubular portion to form the coupling portions integrated with the metal rings and integrate the coupling portions with the tubular portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
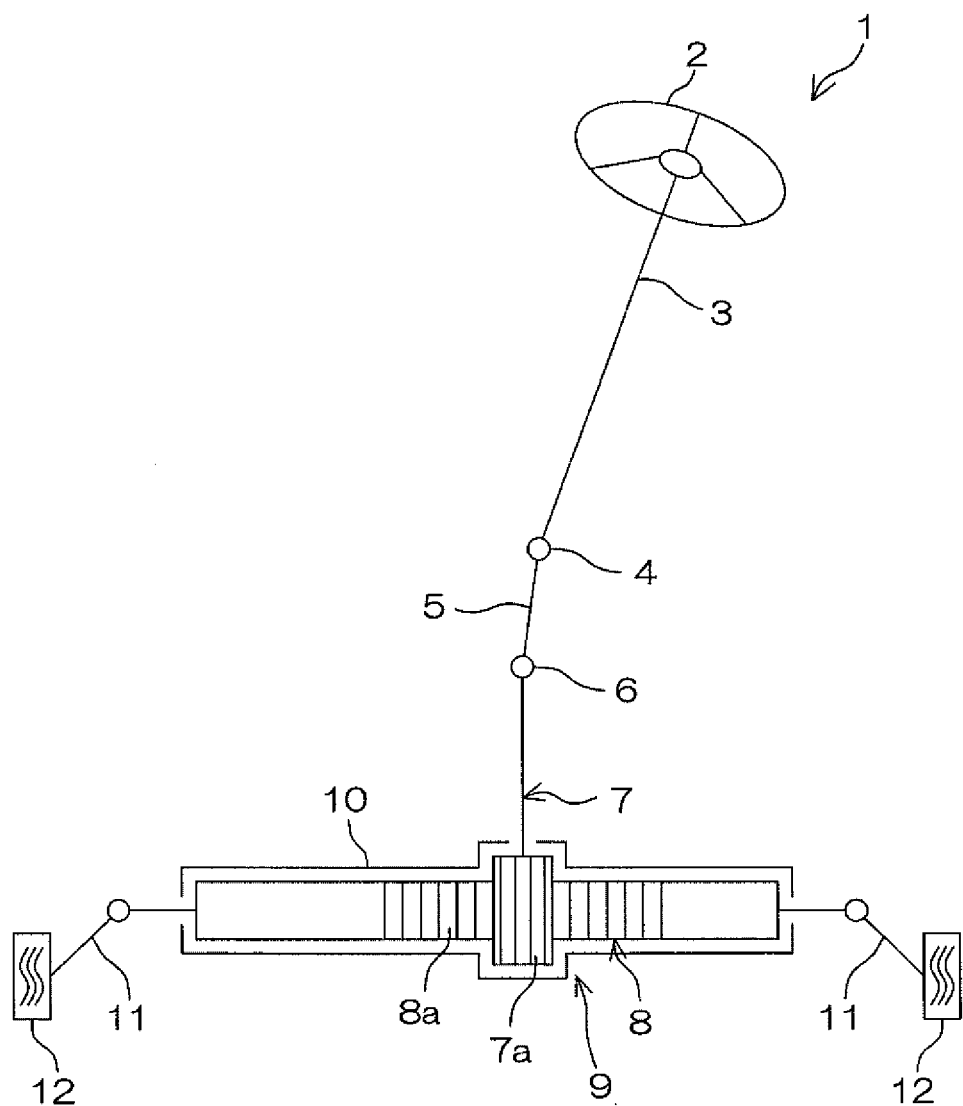
FIG. 1 is a schematic diagram of an example of a steering device into which a rack housing according to the present invention can be incorporated.

FIG. 1 is a schematic diagram of an example of a steering device into which a rack housing according to the present invention can be incorporated. With reference to FIG. 1, a steering device 1 includes a steering shaft 3, an intermediate shaft 5, a pinion shaft 7, and a rack shaft 8. The steering shaft 3 is coupled to a steering wheel 2 so as to be rotatable together therewith. The intermediate shaft 5 is coupled to the steering shaft 3 via a universal joint 4. The pinion shaft 7 is coupled to the intermediate shaft 5 via a universal joint 6. The rack shaft 8 is a steering shaft that extends in the right-left direction of an automobile and that has rack teeth 8a meshed with pinion teeth 7a provided on the pinion shaft 7.

A steering mechanism 9, which is a rack-and-pinion mechanism, is composed of the pinion shaft 7 and the rack shaft 8. The rack shaft 8 is supported in a rack housing 10 fixed to a vehicle body via a plurality of bearings (not illustrated) so as to be linearly reciprocally movable. Both end portions of the rack shaft 8 project from both sides of the rack housing 10. A tie rod 11 is joined to each of the end portions of the rack shaft 8.

The tie rod 11 is coupled to a corresponding steered wheel 12 via a knuckle arm (not illustrated). When the steering wheel 2 is operated to rotate the steering shaft 3, rotation of the steering shaft 3 is converted into linear motion of the rack shaft 8 along the right-left direction of the automobile by the pinion teeth 7a and the rack teeth 8a to steer the steered wheels 12.

Figure 2:
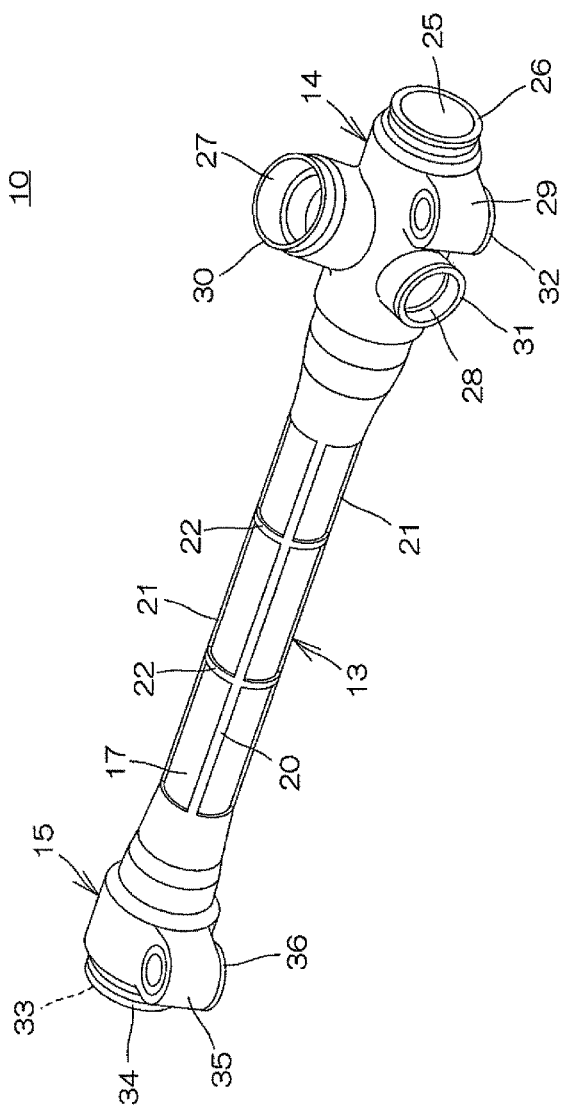
FIG. 2 is a perspective view illustrating an example of an embodiment of the rack housing according to the present invention.
Figure 3A:
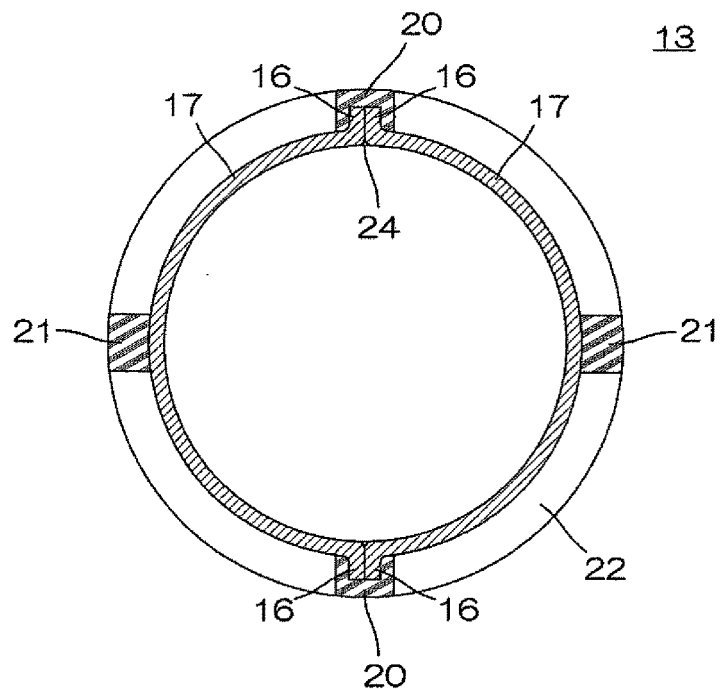
FIG. 3A is a cross-sectional view of a tubular portion of the rack housing in the example of FIG. 2.
Figure 3B:
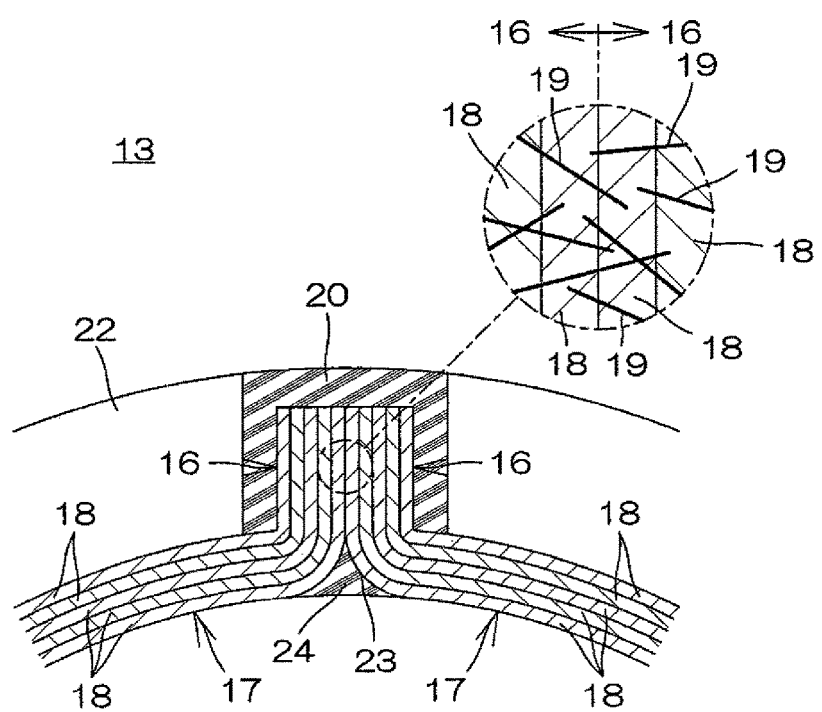
FIG. 3B is a cross-sectional view illustrating a part of FIG. 3A as enlarged.

FIG. 2 is a perspective view illustrating an example of an embodiment of the rack housing according to the present invention. FIG. 3A is a cross-sectional view of a tubular portion of the rack housing in the example of FIG. 2. FIG. 3B is a cross-sectional view illustrating a part of FIG. 3A as enlarged. With reference to FIG. 2, the rack housing 10 in the example includes a tubular portion 13 that covers the rack shaft, and coupling portions 14 and 15 that are integrally continuous with both ends of the tubular portion 13 to be coupled to different members.

With reference to FIGS. 2, 3A, and 3B, the tubular portion 13 is formed by joining two semi-tubular bodies 17 to each other with side surfaces of connecting portions 16 thereof facing each other. The two semi-tubular bodies 17 each have a cross-sectional shape for half the circumference of the tubular portion 13, and have a cross-sectional shape in which both ends in the circumferential direction are bent outward over the entire length of the tubular portion 13 in the axial direction to form the connecting portions 16 in a flat plate shape. The semi-tubular bodies 17 as a whole, which include the connecting portions 16, are formed from fiber-reinforced composite materials 18 obtained by stacking a plurality of layers of fiber sheets impregnated with a thermoplastic resin on each other and integrating the plurality of layers of fiber sheets via the thermoplastic resin.

In the plurality of layers of stacked fiber-reinforced composite materials 18, the joint between the layers is reinforced by fillers 19 provided at random to penetrate at least two layers of the fiber-reinforced composite materials 18. This prevents separation between the layers and a reduction in strength, shock resistance, heat shock properties, etc. due to such separation.

In addition, two layers of the fiber-reinforced composite materials 18 constituting the side surfaces of the connecting portions 16 and stacked on each other to join the connecting portions 16 to each other are also integrated with each other via a thermoplastic resin. At the same time, such a joint is reinforced by the fillers 19 provided at random to penetrate the fiber-reinforced composite materials 18 including the two layers. This prevents separation between the semi-tubular bodies 17.

When joined to each other, the connecting portions 16, which project outward in the radial direction of the tubular portion 13, are covered by ribs 20. The ribs 20 are integrally provided to extend over the entire length of the tubular portion 13 in the axial direction. This prevents separation much more positively by further reinforcing the joint between the connecting portions 16. Ribs 21 are provided on the outer periphery of the tubular portion 13 at intermediate positions between the two ribs 20 in the circumferential direction to extend over the entire length of the tubular portion 13 in the axial direction in parallel with the ribs 20. In addition, annular ribs 22 are provided on the outer periphery of the tubular portion 13 at two intermediate positions in the axial direction to extend over the entire circumference of the tubular portion 13 orthogonally to the ribs 20 and 21.

In addition, the inner periphery of the tubular portion 13, which includes recessed portions 23 formed by bending the connecting portions 16 outward in the radial direction, is coated with a coating 24 so as to fill the recessed portions 23. This improves sliding properties etc. with respect to the rack shaft 8 by smoothing the inner periphery of the tubular portion 13. The ribs 20 to 22 and the coating 24 are all formed integrally from a thermoplastic resin containing the fillers 19 together with the coupling portions 14 and 15 to be described next.

With reference to FIGS. 1 and 2, the coupling portion 14 as a whole is formed from a thermoplastic resin containing the fillers 19, and formed in a generally tubular shape to be continuous from one end of the tubular portion 13. The coupling portion 14 has an opening 25 that is provided on the opposite side of the coupling portion 14 from the tubular portion 13 to allow one end portion of the rack shaft 8 to project out of the rack housing 10.

The opening 25 is provided integrally with a metal ring 26 that reinforces the opening 25 and that is used for attachment of a boot (not illustrated) that closes the opening 25 while allowing linear motion of the rack shaft 8.

In addition, an opening 27 for insertion of the pinion shaft 7 and an opening 28 for insertion of a rack guide (not illustrated) are formed in a side surface of the coupling portion 14. An attachment portion 29 for fixation of the rack housing 10 to the vehicle body is provided to project from the side surface of the coupling portion 14. The opening 27 is provided integrally with a metal ring 30 that reinforces the opening 27 and that is used for attachment of a cover (not illustrated) for the pinion shaft.

In addition, the opening 28 is provided integrally with a metal ring 31 that reinforces the opening 28 and that is used for attachment of a sealing member (not illustrated) that closes the opening 28 after insertion of the rack guide (not illustrated). Further, the attachment portion 29 is formed integrally with the coupling portion 14 from the thermoplastic resin containing the fillers 19, and provided integrally with a metal ring 32 including a through hole for insertion of a bolt or the like for attachment.

The coupling portion 15 as a whole is formed from a thermoplastic resin containing the fillers 19, and formed in a generally tubular shape to be continuous from the other end of the tubular portion 13. The coupling portion 15 has an opening 33 that is provided on the opposite side of the coupling portion 15 from the tubular portion 13 to allow the other end portion of the rack shaft 8 to project out of the rack housing 10. The opening 33 is provided integrally with a metal ring 34 that reinforces the opening 33 and that is used for attachment of a boot (not illustrated) that closes the opening 33 while allowing linear motion of the rack shaft 8.

In addition, an attachment portion 35 for fixation of the rack housing 10 to the vehicle body is provided to project from a side surface of the coupling portion 15. The attachment portion 35 is formed integrally with the coupling portion 15 from the thermoplastic resin containing the fillers 19, and provided integrally with a metal ring 36 including a through hole for insertion of a bolt or the like for attachment.

Figure 4A:
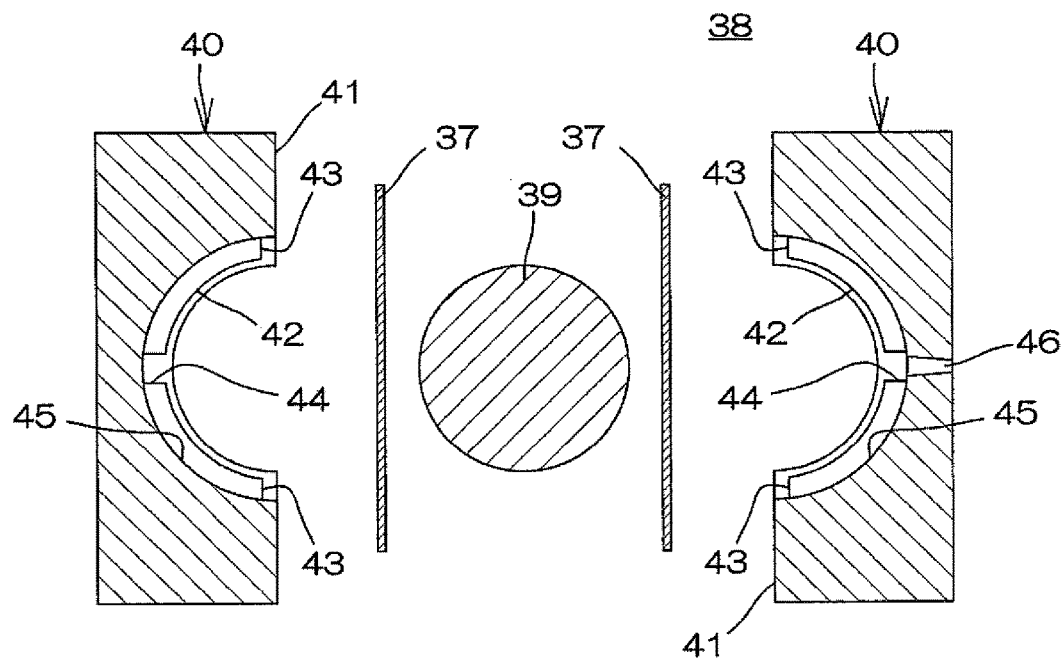
FIGS. 4A and 4B are each a cross-sectional view illustrating a process of manufacturing the rack housing of FIG. 2 by a manufacturing method according to the present invention.
Figure 4B:
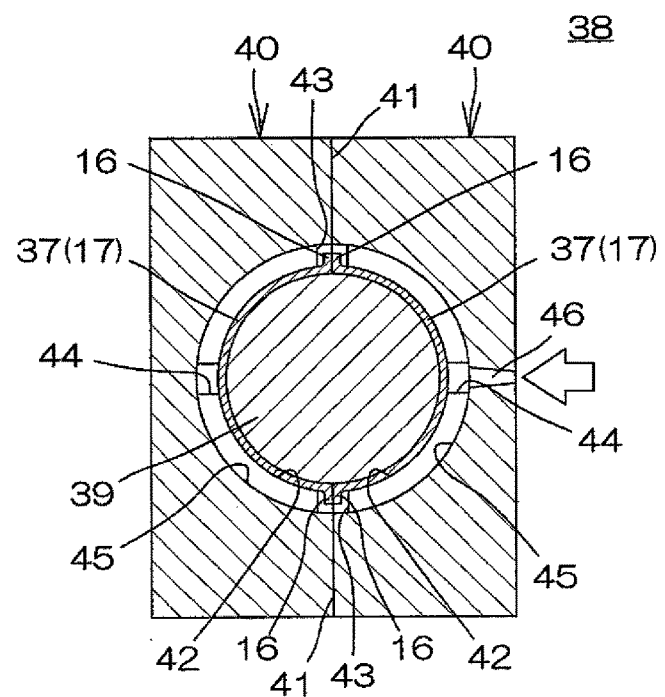

FIGS. 4A and 4B are each a cross-sectional view illustrating a process of manufacturing the rack housing of FIG. 2 by a manufacturing method according to the present invention. With reference to FIG. 4A, a mold 38 for injection molding is used in the example to perform a press forming process and an injection molding process. In the press forming process, two prepregs 37 in a flat plate shape, from which the semi-tubular bodies 17 are to be formed, are formed into the shape of the semi-tubular bodies 17 by press forming, and joined to each other to form the tubular portion 13. In the injection molding process, a thermoplastic resin containing the fillers 19 is injected for injection molding to form the coupling portions 14 and 15 which are continuous with both ends of the tubular portion 13.

The mold 38 includes a columnar inner mold 39 and a pair of outer molds 40. The inner mold 39 has an outside diameter corresponding to the inside diameter of the tubular portion 13 in a region corresponding to the tubular portion 13. The outer molds 40 are provided with respective mating surfaces 41 that are brought into abutment with each other when the outer molds 40 are clamped to each other. The outer molds 40 are each provided with a recessed portion 42 for half the circumference that is recessed from the mating surface 41 and that has a diameter corresponding to the outside diameter of the tubular portion 13 and a length corresponding to the entire length of the tubular portion 13 in the axial direction.

In addition, the outer molds 40 are each provided with recessed grooves 43 to 45 that communicate with the recessed portion 42 and that correspond to the ribs 20 to 22, respectively. That is, the recessed groove 43 having a depth corresponding to half the thickness of the rib 20 and extending over the entire length of the recessed portion 42 is formed in an opening portion of the recessed portion 42 at the mating surface 41. In addition, the recessed groove 44 corresponding to the rib 21 and extending over the entire length of the recessed portion 42 is formed in the deepest portion of the recessed portion 42. Further, the recessed grooves 45 in an arcuate shape corresponding to the ribs 22 are formed at two locations of the recessed portion 42 in the axial direction of the tubular portion 13.

Further, the outer mold 40 on the right side in the drawing is provided with a gate 46 to be connected to the distal end of a nozzle of an injection molding machine (not illustrated) to inject a thermoplastic resin containing the fillers 19 into the mold 38.

In addition, although not illustrated, regions corresponding to the three-dimensional shapes of the coupling portions 14 and 15 illustrated in FIG. 2 and including holding portions which are provided at predetermined locations and at which the metal rings 26, 30, 31, 32, and 36 described above are to be set are continuously formed on both sides (forward and backward sides with respect to the drawing sheet surface), in the axial direction, of a region of the mold 38 corresponding to the tubular portion 13.

In order to manufacture the rack housing 10 of FIG. 2 using the mold 38, first, two prepregs 37 in a flat plate shape, from which the semi-tubular bodies 17 are to be formed, are prepared. The prepregs 37 in a flat plate shape are formed, for example, by impregnating fiber sheets with a thermoplastic resin to obtain fiber-reinforced composite materials 18, stacking a plurality of layers of the fiber-reinforced composite materials 18 on each other, and heating the stack of fiber-reinforced composite materials 18 under pressure using a hot press to a temperature around the melting point of the thermoplastic resin to melt and integrate the thermoplastic resin in the fiber-reinforced composite materials 18.

Next, the two prepregs 37 in a flat plate shape are inserted into spaces between the inner mold 39 and the pair of outer molds 40 with the prepregs 37 heated to a temperature around the melting point of the thermoplastic resin using an oven or an infrared heater to be softened or melted, for example (FIG. 4A). In addition, although not illustrated, the metal rings 26, 30, 31, 32, and 36 are set at the holding portions in the regions of the mold 38 corresponding to the coupling portions 14 and 15.

Next, with reference to FIG. 4B, the pair of outer molds 40 are clamped to each other with the inner mold 39 interposed therebetween and with the mating surfaces 41 facing each other. Consequently, the prepregs 37 are formed into the shape of the semi-tubular bodies 17 by press forming, and joined to each other at the connecting portions 16. Then, as indicated by the white arrow in the drawing, a thermoplastic resin containing the fillers 19 is injected into the mold 38 through the gate 46.

Then, the plurality of layers of fiber-reinforced composite materials 18 are firmly joined to each other by the thermoplastic resin contained in the fiber-reinforced composite materials 18 themselves, the thermoplastic resin permeating between and into the fiber-reinforced composite materials 18 through injection molding, and the fillers 19 penetrating at least two layers of the stacked fiber-reinforced composite materials 18 to form semi-tubular bodies 17, from which the tubular portion 13 is to be formed.

In addition, two layers of the fiber-reinforced composite materials 18 constituting the side surfaces of the connecting portions 16 and stacked to join the connecting portions 16 to each other are joined to each other via the thermoplastic resin, and such a joint is reinforced by the fillers 19 penetrating the fiber-reinforced composite materials 18 including the two layers to integrate the semi-tubular bodies 17 with each other to form the tubular portion 13. In addition, a thermoplastic resin containing the fillers 19 is injected through the gate 46 to form ribs 20 to 22 integrally on the outer periphery of the formed tubular portion 13 and coat the inner periphery of the tubular portion 13 with a coating 24.

At the same time, the coupling portion 14 integrated with the metal rings 26, 30, 31, and 32 is formed integrally on one end side of the tubular portion 13, and the coupling portion 15 integrated with the metal ring 36 is formed integrally on the other end side of the tubular portion 13. By opening the mold 38 and taking out the product after that, the rack housing 10 illustrated in FIG. 2 is obtained.

According to the manufacturing method, two processes, namely a process in which the tubular portion 13 is formed by press forming using two prepregs 37 formed from a fiber-reinforced composite material such as CFRTP with a thermoplastic resin and a process in which the coupling portions 14 and 15 are formed by injection molding using a thermoplastic resin containing fillers and integrated with each other, can be performed continuously using the same mold 38. In addition, the process of forming the tubular portion 13 does not require a temperature rising time, a curing time, or energy for heating the components during such times unlike the process in which a thermoplastic resin is used, and the rack housing 10 can be obtained just by taking the product out of the mold 38 after the subsequent injection molding. This allows a significant reduction in time and energy required for the manufacture.

Therefore, it is possible to efficiently manufacture the rack housing 10 in as short a time as possible and with as little energy as possible, the rack housing 10 having the tubular portion 13 and the coupling portions 14 and 15 formed from composite materials containing a thermoplastic resin and thus being lightweight compared to that according to the related art, which as a whole is formed from die-cast aluminum or the like. In the manufactured rack housing 10, moreover, the joint between at least two adjacent layers of the fiber-reinforced composite materials 18 constituting the tubular portion 13 is reinforced by the fillers 19 penetrating such layers. In addition, the tubular portion 13 and the coupling portions 14 and 15 are formed integrally from a thermoplastic resin containing fillers. Therefore, the rack housing 10 is lightweight, has necessary strength and rigidity, and can contribute to weight reduction of vehicles such as automobiles and energy saving.

Examples of the fiber sheets, from which the fiber-reinforced composite materials 18 are formed, include a woven fabric, a non-woven fabric, a strand, etc. formed from a variety of fibers such as carbon fibers, glass fibers, and aramid fibers. The type of the fiber sheets may be changed as appropriate. In addition, examples of the thermoplastic resin with which the fiber sheets are impregnated include common thermoplastic resins such as polyamide 66, polyphenylene sulfide (PPS), thermoplastic polyurethane (TPU), and polyether ether ketone (PEEK). The type of the thermoplastic resin may be changed as appropriate.

The thermoplastic resin for injection molding may be a thermoplastic resin that is of the same type as or a different type from the thermoplastic resin with which the fiber sheets are impregnated and that is compatible with the latter thermoplastic resin. The thermoplastic resin of the same type as the latter thermoplastic resin is particularly preferable.

In addition, the thermoplastic resin for injection molding is preferably a thermoplastic resin with a higher melt flow rate than that of the thermoplastic resin with which the fiber sheets are impregnated.

By injecting a thermoplastic resin with a high melt flow rate and a high flowability for injection molding, the thermoplastic resin and the fillers 19 permeate well between the layers of fiber-reinforced composite materials 18 and in the fiber-reinforced composite materials 18, which positively prevents separation between the layers. For this effect, the thermoplastic resin for injection molding preferably has a melt flow rate of 30 g/10 min or more, particularly preferably 50 g/10 min or more. If the melt flow rate is less than such ranges, separation between the layers may not be prevented effectively by causing the thermoplastic resin and the fillers 19 to permeate well between the layers of fiber-reinforced composite materials and in the fiber-reinforced composite materials.

The fillers 19 may be a variety of fillers in the form of fibers or plates that may penetrate at least two layers of the stacked fiber-reinforced composite materials 18 to reinforce the joint between such layers. Carbon fibers in the form of long fibers are particularly preferable. The carbon fibers are highly strong themselves, and the carbon fibers in the form of long fibers can penetrate two or more layers of the stacked fiber-reinforced composite materials 18. Therefore, such fibers have a good joint reinforcing effect.

In order to obtain the effect described above, the fiber length of fibers in the form of long fibers such as carbon fibers is preferably equal to or more than the thickness of the fiber-reinforced composite materials 18 and equal to or less than 10 mm. The fiber length is preferably equal to or less than 10 mm for the fibers to be dispersed in the fiber-reinforced composite materials 18 as smoothly and uniformly as possible by injection molding. The present invention is not limited to the examples in the drawings described above, and may be applied to the manufacture of rack housings having a variety of shapes and structures.

What is claimed is:

1. A rack housing manufacturing method comprising:
    setting metal rings for coupling with or for insertion of different members in regions of a mold corresponding to coupling portions, the mold corresponding to a three-dimensional shape of a rack housing including a tubular portion that covers a rack shaft and the coupling portions which are continuous with both ends of the tubular portion to be coupled to the different members, and setting two heated prepregs in a region of the mold corresponding to the tubular portion, the prepregs being formed by stacking at least two layers of fiber-reinforced composite materials obtained by impregnating fiber sheets with a thermoplastic resin;
    clamping a die to form the two prepregs by press forming each into a shape having a semi-tubular body corresponding to half a circumference of the tubular portion and connecting portions in a flat plate shape extending outward from both ends of the semi-tubular body in a circumferential direction over an entire length of the tubular portion in an axial direction, and joining the semi-tubular bodies to each other with side surfaces of their respective connecting portions facing each other to form the tubular portion; and
    injecting a thermoplastic resin containing fillers for injection molding into an entirety of the regions corresponding to the coupling portions and the tubular portion to form the coupling portions integrated with the metal rings and integrate the coupling portions with the tubular portion.

2. The rack housing manufacturing method according to claim 1, wherein
    the injection molding includes forming ribs that cover the connecting portions joined to each other using the thermoplastic resin containing the fillers.

3. The rack housing manufacturing method according to claim 2, wherein
    the injection molding includes injecting a thermoplastic resin with a higher melt flow rate than that of the thermoplastic resin with which the fiber sheets are impregnated.

4. A rack housing manufactured by the manufacturing method according to claim 3, wherein
    a joint between at least two adjacent layers of the fiber-reinforced composite materials constituting the tubular portion is reinforced by the fillers which penetrate such layers, and the tubular portion and the coupling portions which are continuous with both ends of the tubular portion are formed integrally from the thermoplastic resin containing the fillers, and wherein the tubular portion is formed by joining two semi-tubular bodies to each other with side surfaces of connecting portions thereof facing each other.

5. A rack housing manufactured by the manufacturing method according to claim 2, wherein
    a joint between at least two adjacent layers of the fiber-reinforced composite materials constituting the tubular portion is reinforced by the fillers which penetrate such layers, and the tubular portion and the coupling portions which are continuous with both ends of the tubular portion are formed integrally from the thermoplastic resin containing the fillers, and wherein the tubular portion is formed by joining two semi-tubular bodies to each other with side surfaces of connecting portions thereof facing each other.

6. The rack housing manufacturing method according to claim 1, wherein
the injection molding includes injecting a thermoplastic resin with a higher melt flow rate than that of the thermoplastic resin with which the fiber sheets are impregnated.

7. A rack housing manufactured by the manufacturing method according to claim 6, wherein
a joint between at least two adjacent layers of the fiber-reinforced composite materials constituting the tubular portion is reinforced by the fillers which penetrate such layers, and the tubular portion and the coupling portions which are continuous with both ends of the tubular portion are formed integrally from the thermoplastic resin containing the fillers, and wherein the tubular portion is formed by joining two semi-tubular bodies to each other with side surfaces of connecting portions thereof facing each other.

8. A rack housing manufactured by the manufacturing method according to claim 1, wherein
a joint between at least two adjacent layers of the fiber-reinforced composite materials constituting the tubular portion is reinforced by the fillers which penetrate such layers, and the tubular portion and the coupling portions which are continuous with both ends of the tubular portion are formed integrally from the thermoplastic resin containing the fillers, and wherein the tubular portion is formed by joining two semi-tubular bodies to each other with side surfaces of connecting portions thereof facing each other.

* * * * *